United States Patent
Maus et al.

(10) Patent No.: US 6,902,715 B2
(45) Date of Patent: Jun. 7, 2005

(54) PRECIPITATED SILICAS HAVING A NARROW PARTICLE SIZE DISTRIBUTION

(75) Inventors: Ralf Maus, Frankfurt (DE); Thomas Barthel, Frankfurt (DE); Claas-Jürgen Klasen, Freigericht (DE)

(73) Assignee: Degussa AG, Duesseldorf (DE)

( * ) Notice: Subject to any disclaimer, the term of this patent is extended or adjusted under 35 U.S.C. 154(b) by 174 days.

(21) Appl. No.: 10/067,841

(22) Filed: Feb. 8, 2002

(65) Prior Publication Data

US 2002/0150528 A1 Oct. 17, 2002

(30) Foreign Application Priority Data

Feb. 8, 2001 (DE) .......................................... 101 05 750

(51) Int. Cl.$^7$ .......................... C01B 33/12; C01B 33/18
(52) U.S. Cl. .................. 423/335; 423/339; 106/287.34
(58) Field of Search ................................ 423/335, 339; 106/400, 401, 287.34

(56) References Cited

U.S. PATENT DOCUMENTS

| | | | |
|---|---|---|---|
| 4,495,167 A | * | 1/1985 | Nauroth et al. ............. 423/339 |
| 4,941,820 A | | 7/1990 | Lockwood, Jr. |
| 5,638,609 A | | 6/1997 | Chandran et al. |
| 5,883,139 A | * | 3/1999 | Wideman et al. .......... 521/43.5 |
| 6,180,076 B1 | * | 1/2001 | Uhrlandt et al. ............ 423/335 |
| 6,383,280 B1 | * | 5/2002 | Siray et al. ................. 106/272 |

FOREIGN PATENT DOCUMENTS

| | | |
|---|---|---|
| EP | 0 901 986 | 3/1999 |
| EP | 0 922 671 | 6/1999 |

OTHER PUBLICATIONS

Anonymous, Internet Article, Online ! pp. 1–8, XP-002212801, "Pulse Technology FAQ", Feb. 2, 2001.

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

The present invention provides silica particles, which include the following physical properties: BET surface area: 100–700 m$^2$/g; DBP absorption: 100–500 g/100 g; tamped density: 100–250 g/l; ALPINE sieve residue>63$\mu$: <5%; and particle sizes (cumulative volume distribution): $d_{95}$<40 $\mu$m; $d_{50}$<20 $\mu$m; and $d_5$<10 $\mu$m. The present invention also provides a process for producing silica having a narrow particle size distribution, which includes drying a silica suspension in a pulse combustion dryer to produce silica particles having the following particle size distribution (cumulative volume distribution): $d_5$<10 $\mu$m; $d_{50}$<20 $\mu$m; and $d_{95}$<40 $\mu$m.

21 Claims, 8 Drawing Sheets

Schematic diagram of the PCD with the main apparatus components

- a) natural gas
- b) blower
- c) burner
- d) compressed air
- e) ambient air
- f) exhaust blower
- g) exhaust air
- h) cooling water (in/out)
- i) filter
- j) cyclone
- k) feed liquid
- l) feed pump
- m) drying chamber
- n) product discharge

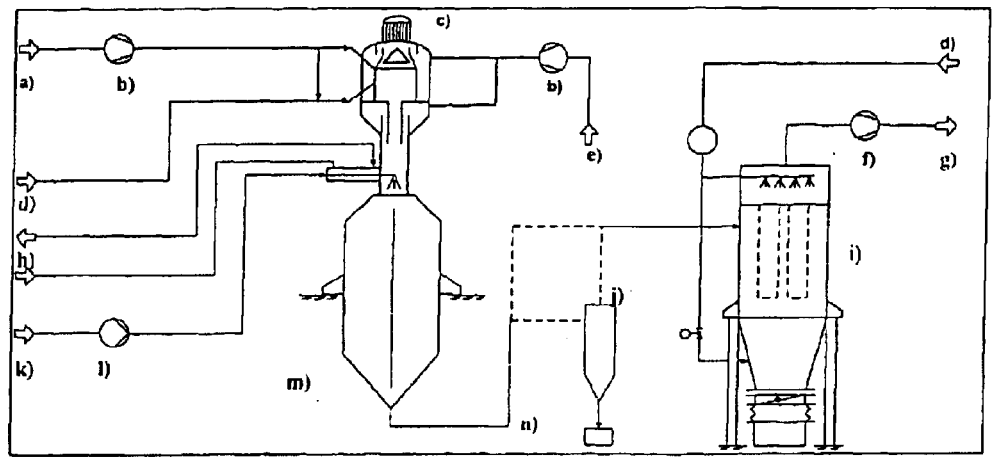
Figure 1  Schematic diagram of the PCD with the main apparatus components
- a) natural gas
- b) blower
- c) burner
- d) compressed air
- e) ambient air
- f) exhaust blower
- g) exhaust air
- h) cooling water (in/out)
- i) filter
- j) cyclone
- k) feed liquid
- l) feed pump
- m) drying chamber
- n) product discharge

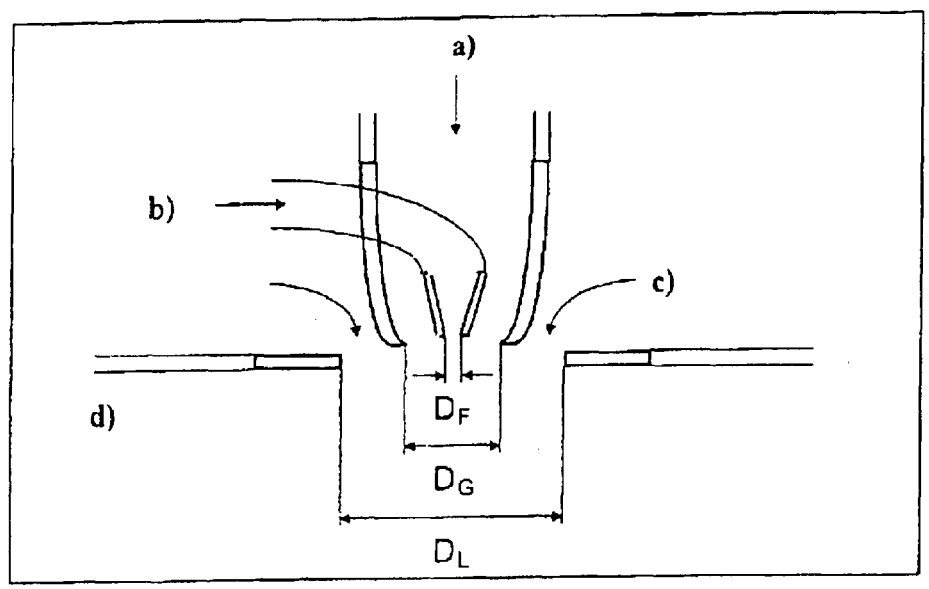
Figure 2  Arrangement of the gas nozzle, the liquid nozzle and the air ring in an experimental apparatus
    a)    combustion gas
    b)    suspension
    c)    ambient air
    d)    drying chamber

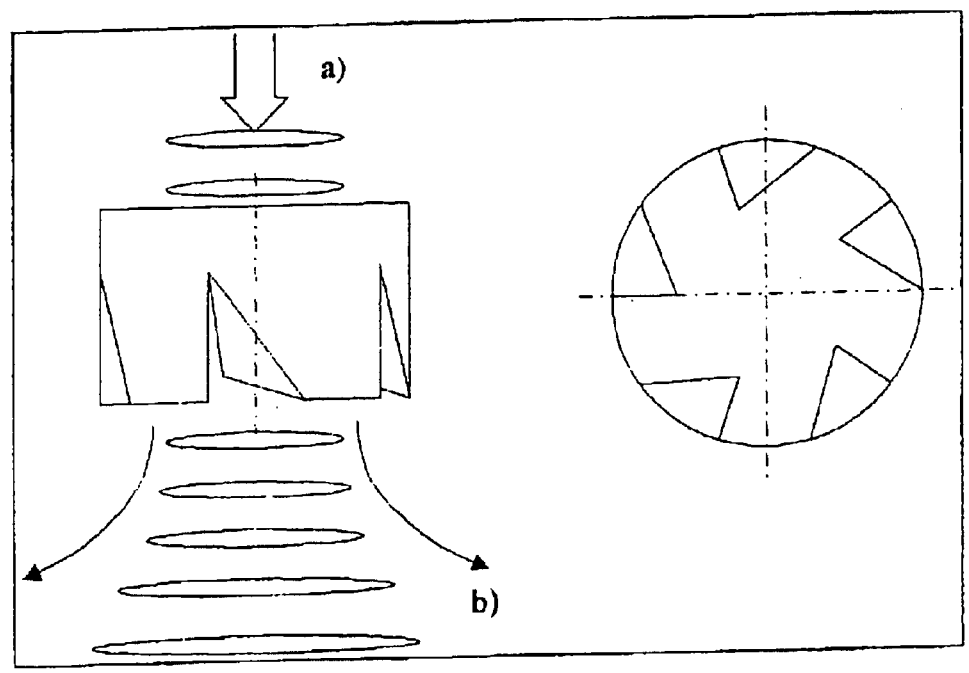
Figure 3  In-principle sketch of the swirl-inducing element
    a)    hot gas stream
    b)    jets widening on entry into the drying chamber

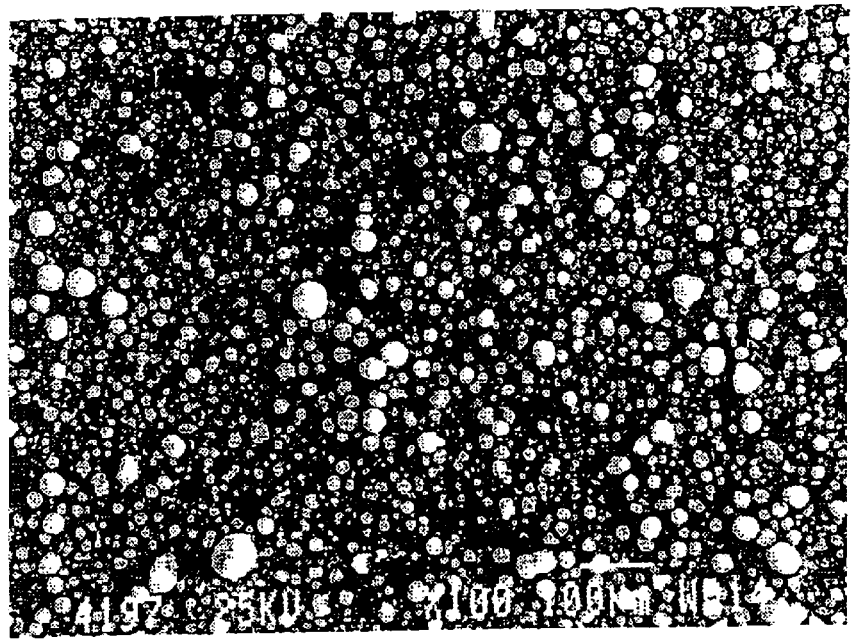
Figure 4  Scanning electron micrograph of precipitated silica dried in the pulse combustion dryer
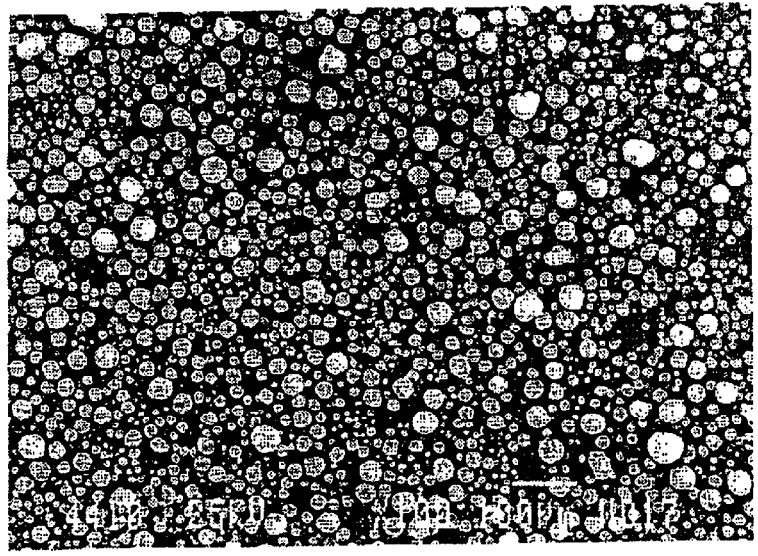
Figure 5  Scanning electron micrograph of pyrogenic silica dried in the pulse combustion dryer

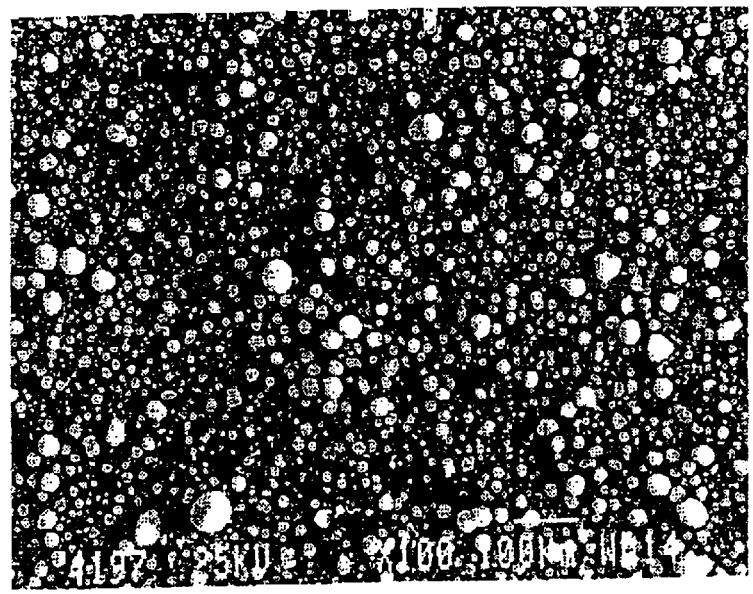
Figure 6  Scanning electron micrograph of precipitated silica dried in the pulse combustion dryer
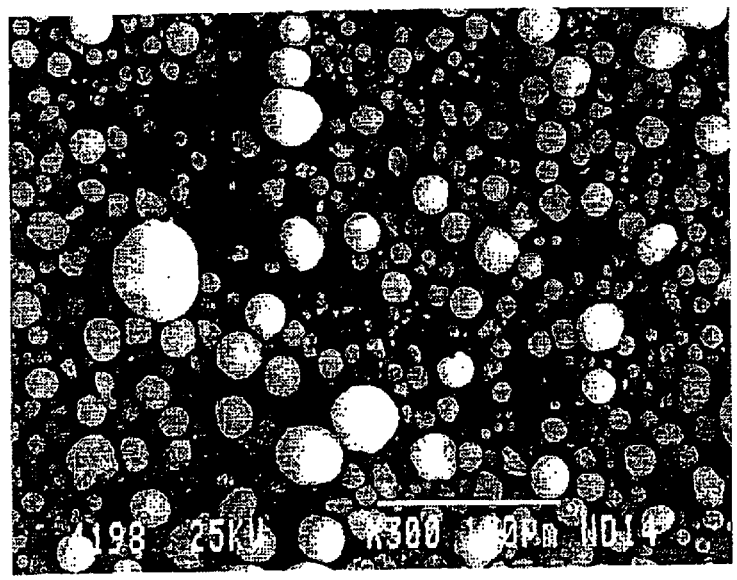
Figure 7  Scanning electron micrograph of precipitated silica dried in the pulse combustion dryer

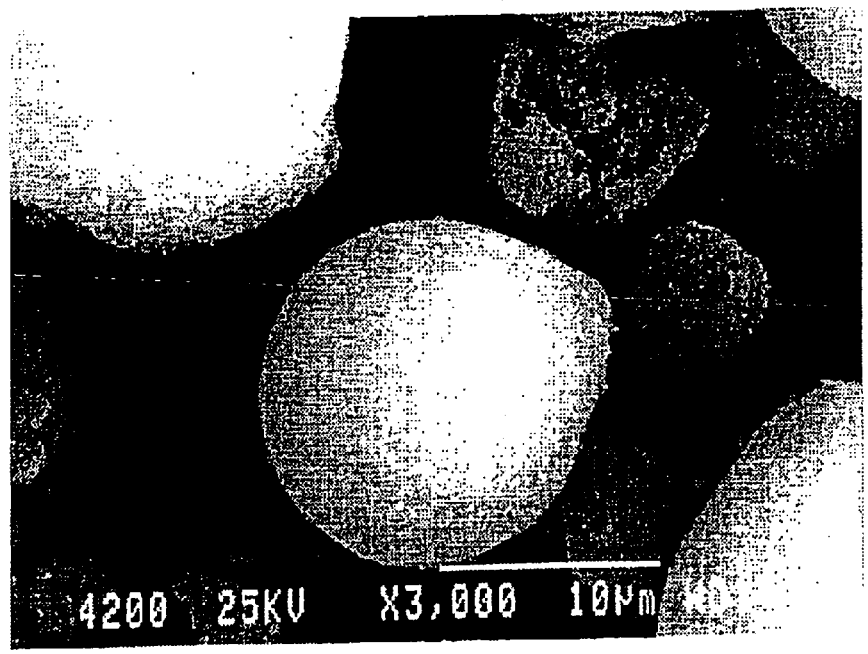
Figure 8  Scanning electron micrograph of precipitated silica dried in the pulse combustion dryer
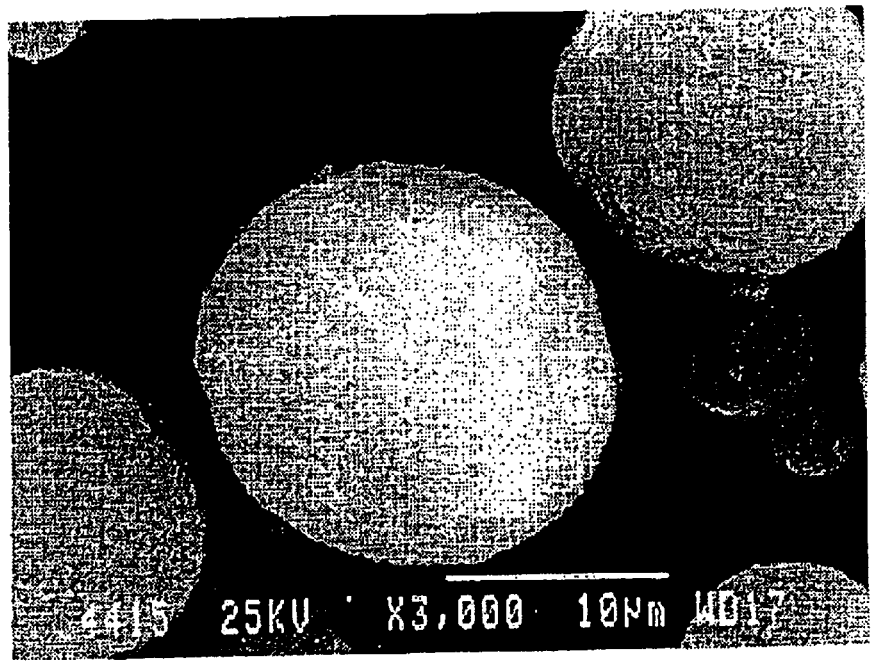
Figure 9  Scanning electron micrograph of pyrogenic silica dried in the pulse combustion dryer

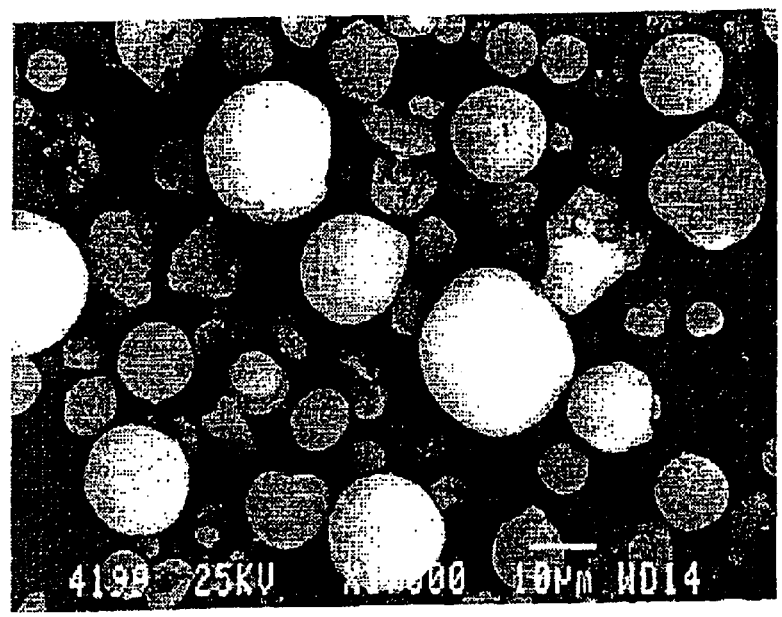
Figure 10 Scanning electron micrograph of precipitated silica dried in the pulse combustion dryer

PRECIPITATED SILICAS HAVING A NARROW PARTICLE SIZE DISTRIBUTION

BACKGROUND OF THE INVENTION

1. Field of the Invention

The invention relates to finely divided silicas having narrow particle size distributions and a process for producing them.

2. Discussion of the Background

Silicas are produced industrially by precipitation of water glass or by combustion of silicon tetrachloride in a stream of $H_2/O_2$. The products obtained in this way usually do not have the desired particle size, or they must be subjected to subsequent drying. The product properties resulting from the production process, e.g. the specific surface areas determined by the BET or CTAB method should be changed as little as possible by the drying/milling step.

Customary apparatuses for comminution or milling of silicas are jet mills or impingement mills, and customary apparatuses for drying are spray dryers, rack dryers, rotary tube dryers or jet towers. Drying a silica suspension in a jet tower simultaneously effects particle formation.

The combination of the process steps: (a) preparation of the silica by precipitation or combustion, (b) drying and (c) milling, even when (b) and (c) coincide, e.g. in a jet tower, is not satisfactory for producing silica particles having a very narrow size distribution, so that a sieving or classification step frequently has to be carried out. This is costly.

SUMMARY OF THE INVENTION

One object of the present invention to provide silica having a finer and narrower particle size distribution.

Another object of the invention is to provide silica having a particle size distribution without the need for milling or classification.

The above objects, and others, have now been achieved by the present invention, the first embodiment of which provides silica particles, which include the following physical properties:

| | |
|---|---|
| BET surface area: | 100–700 m²/g; |
| DBP absorption: | 100–500 g/100 g; |
| tamped density: | 100–250 g/l; |
| ALPINE sieve residue > 63µ: | <5%; and |
| particle sizes (cumulative volume distribution) | $d_{95} < 40$ µm; |
| | $d_{50} < 20$ µm; and |
| | $d_5 < 10$ µm. |

Another embodiment of the present invention provides a coating, which includes the abovementioned silica particles and a binder.

Another embodiment of the present invention provides a silica-filled polymer, which includes the abovementioned silica particles and a polymer.

Another embodiment of the present invention provides a tire, which includes the abovementioned silica particles and a rubber.

Another embodiment of the present invention provides a process for producing silica having a narrow particle size distribution, which includes:

drying a silica suspension in a pulse combustion dryer to produce silica particles having the following particle size distribution (cumulative volume distribution):

$d_5 < 10$ µm;
$d_{50} < 20$ µm; and
$d_{95} < 40$ µm.

BRIEF DESCRIPTION OF THE FIGURES

A more complete appreciation of the invention, and many of the attendant advantages thereof, will be readily obtained, as the same becomes better understood by reference to the following detailed description, when considered in connection with the accompanying drawings, wherein:

FIG. 1 schematically shows a typical pulse combustion dryer (PCD) plant.

FIG. 2 shows the arrangements of gas and liquid nozzles and the air ring.

FIG. 3 shows an in-principle sketch of the swirl-inducing element.

FIG. 4 to 10 show silicas dried by the PCD method.

DESCRIPTION OF THE PREFERRED EMBODIMENTS

Figure 11:
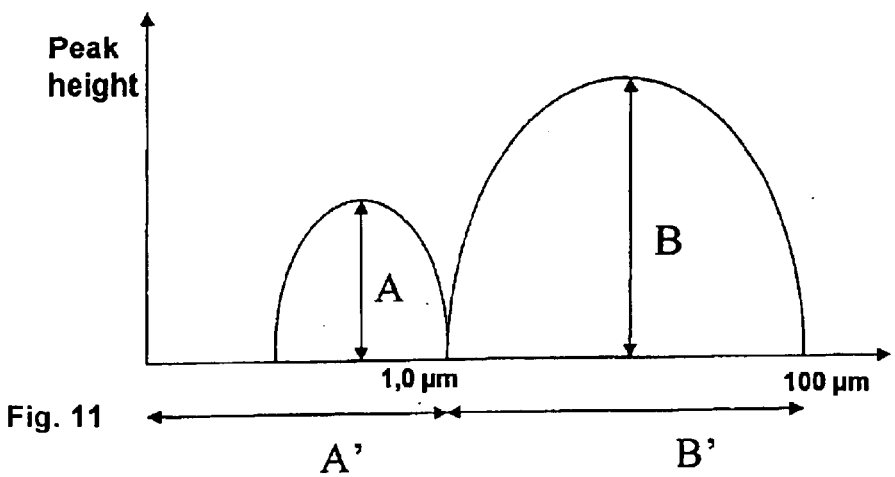
FIG. 11 shows the determination of the wk coefficient.

Various other objects, features and attendant advantages of the present invention will be more fully appreciated as the same becomes better understood from the following detailed description of the preferred embodiments of the invention.

Pulse combustion dryers (PCDs) have been known for a long time for the drying of suspensions (U.S. Pat. Nos. 4,819,873, 4,941,820, 4,708,159, the entire contents of each of which are hereby incorporated by reference). The use of a PCD for the drying of silica suspensions has not been described, however. The effect of the narrow particle size distribution in addition to drying has likewise not been described and was therefore not to be expected.

The present inventors have found that silicas having a finer and narrower particle size distribution can be obtained by drying a silica suspension in a pulse combustion dryer.

Pulse Combustion Dryer

A pulse combustion dryer (PCD) is an apparatus for convective drying of suspensions. An essential feature of this technology is, first and foremost, the natural gas burner which generates a pulsating hot gas stream and at the same time liberates thermal and mechanical energy which is utilized for the atomization and drying of the feed to the dryer.

The pulsation burner which operates on the principle of a Helmholtz resonator at an ignition frequency of about 100 Hz allows the feed to the dryer to be dispersed without moving mechanical parts (rotary atomizer disks) or nozzles. As a result, the stressing of the product (shear) remains low. In addition, the maintenance requirement for the atomization unit is low and a high reliability is obtained.

The high throughput through the combustion chamber and the small gas streams as well as the very rapid drying of the particles results in a comparatively small size of the apparatus.

Compared to stationary combustion, the turbulent flow achieves improved heat and mass transfer.

An advantage is the ability of integrating this technology relatively simply and cheaply into existing plants equipped with conventional spray dryers.

Preferably, the silicas of the present invention are obtained without milling or classification.

FIG. 1 schematically shows a typical PCD plant; the main components and their function are indicated below:

| Element | Function |
|---|---|
| Burner | Generation of a pulsating hot gas stream for atomization and drying of the feed to the dryer |
| Drying chamber | Cools the hot gas stream by mixing with ambient air (quenching); in conjunction with the gas flow, determines the residence time of the particles |
| Intake air blower | Supplies the combustion chamber with air so as to produce an ignitable natural gas/air mixture |
| Natural gas compressor | Compresses the natural gas from the pressure of the supply network to the level required for the burner |
| Feed pump | Conveys the feed to the dryer into the hot gas stream and regulates the temperature at the exit from the dryer by means of the amount fed in |
| Cyclone | Precipitates the solid from the gas stream (partial precipitated), can be bypassed |
| Filter | Precipitates the solid from the gas stream (total precipitated) |
| Exhaust blower | Determines the gas flow |

In the burner, fresh air is drawn in via a rapidly rotating air intake valve. Natural gas is fed separately directly into the combustion chamber where the gas/air mixture is ignited but no continuous flame is present. Since the air intake valve is closed at the instant of ignition, the resulting pressure wave travels downward through the tailpipe into the drying chamber. The suspension is introduced dropwise under virtually atmospheric pressure into the atomization zone below the combustion chamber at the end of the tailpipe. The suspension is fed axially symmetrically into the pulsating hot gas stream through a water-cooled double-walled tube and thus without moving mechanical parts.

To set different operating conditions in respect of temperature and gas throughput, the dryer can be provided with various gas and liquid nozzles. In addition, the amount of ambient air drawn into the dryer chamber can be regulated by varying the air ring. The arrangement of these elements is shown in FIG. 2.

The choice is determined first and foremost by the throughput, but the properties of the suspension and the solid also have to be taken into account. The resonance frequency of the burner is shifted by changing the gas nozzle. This has to be compensated by the rotational speed of the air valve.

Operation of the plant is characterized and regulated primarily by two temperatures. Firstly, the hot gas temperature at the inlet to the drying chamber is set by means of the natural gas flow and, secondly, the feed pump regulates the temperature at the outlet from the chamber by means of the feed flow. Further preferred ways of influencing the operating state are as follows:

| Parameter | Effect |
|---|---|
| Orifice cross section for atomization air | Adjustment of the hot gas temperature |
| Mass flow of the feed to the dryer | Adjustment of the gas outlet temperature |
| Rotational speed of the air intake valve | Influencing of the resonance state |
| Opening cross section of the natural gas valve | Adjustment of the hot gas temperature |
| Volume flow of the bypass air (quenching air) | Drying temperature Amplitude of the pressure waves (atomization action) |

Modification of the Hot Gas Flow

An advantage of the PCD is a very short contact time between hot gas and product. To reduce the contact time still further for sensitive materials to be dried, the installation of a swirl-inducing element is possible. This sets the air stream entering the drying chamber into rotational motion which carries the solid immediately from the hot central zone. A sketch of the swirl-inducing element is shown in FIG. 3.

Particle Size

Drying in the PCD does not have a significant effect on the particle size of the silica set by the precipitation or combustion (of pyrogenic silica) process. However, the distribution is significantly narrower than in the case of spray-dried or milled powder.

Particle Shape

In direct comparison with spray-dried product and even more clearly in comparison with milled powder, the uniform, spherical particle shape of PCD-dried products can be recognized. The particle surface is smoother than in the case of comparative products and has virtually no irregularities. Indications of the formation of hollow spheres were not found, i.e. the silicas of the invention are mostly in the form of solid particles. The formation of larger agglomerates was not observed.

Use Properties

In terms of the product properties specific surface area (BET), DBP absorption, tamped density, sieve residue and residual moisture, the PCD product achieves the specification of the conventionally produced products. The use of a PCD for producing silica particles has notable advantages compared to other drying methods.

The silicas of the invention are prepared in a customary manner by precipitation of water glass with sulfuric acid, with it being possible to use the entire range of possible precipitation variants, as described, for example, in EP 0 078 909, U.S. Pat. No. 4,094,771 or U.S. Pat. No. 6,013,234, the entire contents of each of which are hereby incorporated by reference.

Subsequent to such a precipitation, the solid can be filtered off and the filter cake can be redispersed, optionally with the addition of acid, and subsequently spray dried. Spray-dried precipitated silicas are known and are commercially available, e.g. under the name SIPERNAT®. A similar process is disclosed in U.S. Pat. No. 6,013,234. Here, a silica suspension having a pH of >4 and a solids content of over 18% by weight is spray dried to give particles having a mean particle diameter of above 150 $\mu$m and a BET surface area of from 100 to 350 m$^2$/g. Although spray drying gives spherical particles, the size distribution is not sufficiently narrow.

The particle size distribution can be determined by laser light scattering. In this method, the size of the particles making up 5, 50 and 95% of the volume is determined.

The invention provides silicas which have the following physical and chemical properties:

| | | |
|---|---|---|
| BET surface area (DIN 66131) | m$^2$/g | 100–700 |
| DBP absorption (DIN 53601, based on dry matter) | g/100 g | 100–500 |
| Tamped density (ISO 787-11) | g/l | 100–250 |
| ALPINE sieve residue > 63 $\mu$m (ISO 8130-1) | % | <5 |
| Particle sizes (Cumulative volume distribution) | $d_{95}$ | <40 $\mu$m |
| | $d_{50}$ | <20 $\mu$m |
| | $d_5$ | <10 $\mu$m. |

The present invention further provides a process for producing silica having a fine and narrow particle size distribution, in which the particle size distribution (cumulative volume distribution)

$d_5 < 10 \, \mu m$ $d_{50} < 20 \, \mu m$ $d_{95} < 40 \, \mu m$ is set by drying a silica suspension in a pulse combustion dryer.

In particular embodiments of the invention, the BET surface area values can be in the range from 150 to 600 m²/g, preferably from 200 to 400 m²/g. These ranges include all values and subranges therebetween, including 160, 175, 190, 210, 225, 250, 275, 300, 325, 350, 375, 380 and 390 m²/g.

Furthermore, the DBP absorption can be in the range from 150 to 400 g/l, preferably from 200 to 400 g/l. These ranges include all values and subranges therebetween, including 160, 175, 180, 190, 210, 225, 250, 275, 300, 325, 350, 375, 380 and 390 g/l.

The silicas produced according to the invention or by the process of the invention are firstly prepared by customary methods, e.g. it is possible to use precipitated silicas or pyrogenic silicas.

The abovementioned silicas are fluidized in a suspension having a solids content of from 5 to 25% by weight in water, optionally with addition of acids. This range includes all values and subranges therebetween, including 6, 7, 8, 9, 10, 12, 14, 16, 18, 20, 22 and 24%. For a solids content of above 18% by weight, the pH should be below 4, preferably in the range from 2 to 4, which range includes 3. The suspension obtained in this way is dried at temperatures of from 400 to 800° C., preferably from 650 to 750° C., by means of a pulse combustion dryer (PCD). These ranges include all values and subranges therebetween, including 425, 450, 475, 500, 525, 550, 575, 600, 625, 675, 700, 725 and 775° C.

FIGS. 4 to 10 show silicas dried by the PCD method.

It can readily be seen that most of the particles are spherical and have a relatively smooth surface. Since no shell-shaped fragments of particles are found, it can be assumed that all particles are solid. Very fine particles are found only seldom, since most of them pass through the product cyclone and are separated from the gas stream only in the filter. On a mass basis, the product collected in the filter is negligible at the selected settings.

Furthermore, the silica of the invention can have a high dispersibility.

To achieve, for example, a good property profile in an elastomer mixture, the dispersion of the precipitated silica in the matrix, viz, the elastomer, is of critical importance. It has been found that the wk coefficient is a measure of the dispersibility of a precipitated silica. The wk coefficient is determined as follows:

The measurement is based on the principle of laser light scattering. A CILAS granulometer 1064 L is used for the measurement. For the determination, 1.3 g of the precipitated silica are mixed with 25 ml of water and treated with ultrasound at 100 W (90% pulse) for 4.5 minutes. The suspension is then transferred to the measurement cell and is treated with ultrasound for a further one minute. Detection by means of two laser diodes located at different angles to the sample is carried out during the ultrasound treatment. The laser beams are scattered according to the principle of light scattering. The resulting scattering pattern is analyzed with the aid of a computer. The method makes it possible to determine the particle size distribution over a wide range (about 40 nm–500 µm).

An important point here is that the energy input by means of ultrasound represents a simulation of the energy input by means of mechanical forces in the compounders of the tire industry, i.e. for an elastomer application.

The curves display a first maximum in the particle size distribution in the range 1.0–100 µm and a further maximum in the range <1.0 µm. The peak in the range 1.0–100 µm indicates the proportion of uncomminuted silica particles after ultrasound treatment. These quite large particles are poorly dispersed in the rubber mixtures. The second peak at significantly smaller particle sizes (<1.0 µm) indicates the proportion of silica particles which has been comminuted during the ultrasound treatment. These very small particles are dispersed extremely well in elastomer mixtures.

The wk coefficient is the ratio of the peak height of the particles which cannot be broken down (B), whose maximum is in the range 1.0–100 µm, to the peak height of the particles which have been broken down (A), whose maximum is in the range <1.0 mm.

The relationship is depicted by the graft in FIG. 11. In FIG. 11:

$$wk = \frac{\text{peak height of the particles which cannot be broken down (B)}}{\text{peak height of the particles which have been broken down (A)}}$$

wherein:

A'=range from 0 to 1.0 µm

B'=range 1.0 µm–100 µm.

The range for A' includes all values and subranges therebetween, including 0.001, 0.0025, 0.005, 0.0075, 0.01, 0.025, 0.05, 0.075, 0.1, 0.25, 0.5, 0.75, and 0.95 µm. The range for B' includes all values and subranges therebetween, including 1.1, 1.5, 2, 5, 10, 25, 50, 75, 80, 85, 90, 92, 95, 97 and 99 µm.

The range for A includes all values and subranges therebetween, including 0.001, 0.0025, 0.005, 0.0075, 0.01, 0.025, 0.05, 0.075, 0.1, 0.25, 0.5, 0.75, and 0.95 µm. The range for B' includes all values and subranges therebetween, including 1.1, 1.5, 2, 5, 10, 25, 50, 75, 80, 85, 90, 92, 95, 97 and 99 µm.

(a) The wk coefficient is thus a measure of the ability of the precipitated silica to be broken down (=dispersibility). A precipitated silica can be dispersed more readily the smaller the wk coefficient is and the more particles are broken down on incorporation into an elastomer.

(b) The silicas of the invention have preferable wk coefficients of <3.4. The maximum in the particle size distribution of the particles which cannot be broken down in the precipitated silica of the invention is in the range 1.0–100 µm. The maximum in the particle size distribution of the particles which have been broken down in the precipitated silica of the invention is in the range <1.0 µm.

(c) Known precipitated silicas usually have significantly higher wk coefficients and other maxima in the particle size distributions measured using the CILAS granulometer 1064 L and are thus more difficult to disperse.

It is possible for the silicas of the invention to have an organic or hydrophobic coating. This can be achieved by treatment with a wax emulsion. The silicas treated in this way typically have carbon contents of 5% by weight.

The silicas of the invention, particularly those which have an organic coating or have been made hydrophobic, can be used as matting agents for surface coatings.

The quality of a matting agent is determined by means of the reflectometer value, the grindometer value, the particle sizes and distribution and the proportion of coarse particles (speck content). Silicas used as matting agents frequently have to be milled again and/or classified.

In comparison to the standard product, the product according to the invention displays significantly improved matting properties (60° reflectometer value: 20 compared to 27 for the standard product). The improved matting action can be attributed to the coarser particle size spectrum of the PCD products ($d_{50}$=8 μm, grindometer=39±2 μm) compared to the standard product ($d_{50}$=6 mm, grindometer=28±3 μm).

The grindometer values and speck contents of the silicas of the invention can be improved further, if desired, by classification of the products according to the invention.

The matting-relevant properties set in the precipitation could be obtained to a particular degree by means of the PCD. The technology is thus particularly useful for drying finely divided silica suspensions.

Apart from coating with organic components, the silicas can be made hydrophobic before drying. Organosilane compounds such as dimethylsilane or silicone oils are particularly suitable for this purpose.

The silicas of the invention can also be used as fillers in elastomer mixtures, e.g. for tires. Here, the high dispersibility is particularly important since the silicas have to be dispersed quickly and homogeneously in the mixture.

The dispersibility is, as described, determined by means of the wk coefficient. Silicas according to the invention have wk coefficients of less than 3.4, preferably less than 2. These ranges include all values and subranges therebetween, including 0.01, 0.05, 0.1, 0.5, 1, 1.0, 1.1, 1.25, 1.5, 1.75, 1.9, 2.0, 2.1, 2.5, 2.75, 2.9, 3, 3.0, 3.1, 3.2, 3.3, and 3.35.

The present invention therefore also provides elastomer mixtures such as tires which include the silicas of the invention or silicas produced according to the invention. Other preferred articles that include the silicas of the invention in combination with one or more elastomers include belts, hoses, gaskets, and the like.

The further product properties of the silicas are largely determined by the drying temperature and can, if desired, be altered by changing the initial temperature of the PCD. These temperatures are in the range from 100 to 130° C. This range includes all values and subranges therebetween, including 101, 102, 105, 110, 115, 120, 125, 127, and 129° C.

The pH values of the silicas are barely changed by the PCD drying of the suspension, and are determined by the pH of the suspension. This pH can be altered by, for example, addition of acids and/or bases.

In a particular embodiment of the invention, the silica is granulated after drying. This is preferred in the processing of very finely divided silicas to bind the dust. Furthermore, the silica can be classified to achieve a further reduction in the proportion of fines or of coarse materials. This can be carried out by means of commercial classification sieves.

It is also possible to carry out a rough classification of the silica by means of the configuration of a PCD plant shown schematically in FIG. 1.

In a particular embodiment of the invention, the dried product from the drying chamber is collected by means of a cyclone and a filter. The relatively large particles having the abovementioned median values are obtained in the cyclone.

The silica particles collected in the filter are smaller and have a particle distribution in which $d_{95}$=<40, $d_{50}$<50 and $d_5$<5 μm.

As shown in FIGS. 1 and 2, the process can also be carried out with cooling of the product stream. The PCD can therefore include, in addition to the gas nozzle and the swirl-inducing element, a facility for introducing air ("air ring", "compressed air") or water ("cooling water").

EXAMPLES

Having generally described this invention, a further understanding can be obtained by reference to certain specific examples which are provided herein for purposes of illustration only and are not intended to be limiting unless otherwise specified.

1. Introduction

Matting agents based on precipitated silicas are produced by various processes in which the desired product properties are determined. An important use-related parameter is the grindometer value which is generally set by milling/classifying the dried product. Drying methods used are slow drying by means of rack dryers and quick drying by means of spray dryers.

2. Experimental Arrangement as Shown in FIG. 1

The PCD used is an apparatus for the convective drying of suspensions. This technology requires first and foremost the natural gas burner which generates a pulsating hot gas stream and in the process liberates thermal and mechanical energy which is utilized for atomization and drying of the feed to the dryer. The pulsation burner which operates on the principle of a Helmholtz resonator at an ignition frequency of about 100 Hz allows the feed to the dryer to be dispersed without moving mechanical parts (rotary disk atomizers) or nozzles. The fine droplet spectrum is generated by the high frequency of the pressure waves.

3. Experimental Procedure

The feed used for the PCD was a suspension of a precipitated silica prepared as described in EP 0 901 986, the entire contents of which are hereby incorporated by reference. For this purpose, a corresponding filter cake was fluidized by addition of water. As experimental parameters, the solids concentration (4–12%), the hot gas temperature (750 and 450° C.) and the outlet temperature of the dryer (105 and 125° C.) were varied. As additional parameters in the second campaign (with a view to comminution of the particles and thus variation of the grindometer value), the suspension was sheared by means of high-performance dispersion apparatuses for different periods of time. The powders produced under the abovementioned conditions were subsequently analyzed in respect of various product properties, in particular particle sizes and properties in surface coatings. The particle size distributions were measured by means of laser light scattering (CILAS, 60 sec ultrasound). The grindometer value was determined in triplicate in a black surface coating and the mean was calculated (standard deviation <5 μm).

4. Experimental Results 4.1 Comparison of Spray Drying With PCD

Figure 12:
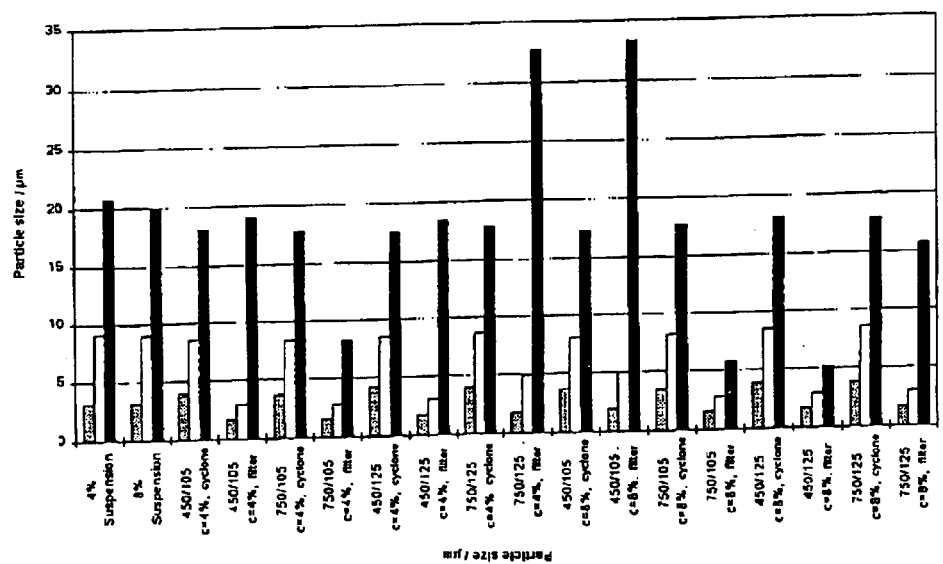
FIG. 12 shows particle size distributions measured using light scattering of the product dried using PCD and the particle size distribution of the silica suspension before drying.

As target parameters, only the particle sizes of the produced powder are discussed here. The results in FIG. 12 show that the particle size distributions (measured using laser light scattering) of the product (cyclone) dried using the PCD and that of the initial suspension are virtually very similar. This means that the PCD product is significantly coarser than the milled final product described in EP 0901 986.

x=particle size for cumulative proportion temperatures: inlet/outlet c=solids concentration in the feed to the dryer, in %

Data for product from cyclone or filter (see FIG. 1)

This is also reflected in the data for the glaze values (a parameter relevant to surface coatings) which are significantly below that for the standard product described in EP 0 901 986. The mean 60° reflectometer value for the 10 experimental products examined here is 20±2 points and the mean grindometer value is 39±2 μm. The product thus has matting properties superior to those of silicas as described in EP 0 901 986. This confirms that the atomization method using the PCD produces a significantly finer and narrower particle size spectrum than does a spray dryer with two-fluid nozzles.

4.2 Classified PCD Experimental Products

In a further process step, selected PCD experimental products were classified using an ALPINE ATP 50 laboratory classifier in order to reduce the proportion of specks or to eliminate them entirely. Classification was carried out on 5 selected samples having relatively high speck contents and grindometer values in order to obtain a conservative evaluation of the classification process. The table below shows the results obtained.

Mean particle sizes, grindometer value and fines contents of classified precipitated silicas

|  | Standard product as described in EP 0 901 986 | Silica according to the invention | V1-F | V2-F | V3-F | V4-F | V6-F | V7-F | V8-F | V9-F | V10-F |
|---|---|---|---|---|---|---|---|---|---|---|---|
| $d_{50}$ | 6.00 | 8.20 | 8.30 | 7.50 | 6.90 | 6.40 | 6.00 | 7.10 | 6.30 | 7.50 | — |
| Grindometer value in $\mu$m | 28.00 | 39.00 | 30.67 | 27.00 | 22.00 | 27.00 | 28.67 | 27.00 | 24.00 | 24.00 | 28.00 |
| Specks up to, in $\mu$m | — | 86.67 | 40.00 | 36.67 | 33.67 | 38.67 | 41.33 | 36.00 | 34.33 | 35.33 | 38.67 |
| Yield or fines content | — | 1.00 | 0.99 | 0.99 | 0.92 | 0.64 | 0.52 | 0.98 | 0.92 | 0.95 | 0.89 |

The data shows that a significant reduction in the specks and the grindometer values can be achieved. Grindometer values of 22–31 $\mu$m at mean particle sizes of 6.4–8.3 $\mu$m were achieved. Most of the classified products still contain small amounts of specks, but these can be attributed to the very high speck content of the starting material. The fines contents of the classified materials were in most cases in the range 90–99% and thus at relatively high yields.

The results show that speck contents and grindometer values typical of or required for matting agents can be obtained by subsequent, efficient classification of the PCD products.

The BET surface area, DBP absorption, tamped density, and ALPINE sieve residue>63 $\mu$ are terms which are known in the art and are preferably measured according to the following standards, the entire contents of each of which are hereby incorporated by reference:

BET surface area: DIN 66131;
DBP absorption: DIN 53601, based on dry matter;
tamped density: ISO 787-11; and
ALPINE sieve residue>63$\mu$: ISO 8130-1.

Obviously, numerous modifications and variations of the present invention are possible in light of the above teachings. It is therefore to be understood that within the scope of the appended claims, the invention may be practiced otherwise than as specifically described herein.

This application is based on German patent application DE 10105750.4, filed Feb. 8, 2001, the entire contents of which being hereby incorporated by reference, the same as if set forth at length.

What is claimed is:

1. Silica particles, comprising the following physical properties:

| | |
|---|---|
| BET surface area: | 100–700 m$^2$/g; |
| DBP absorption: | 100–500 g/100 g; |
| tamped density: | 100–250 g/l; |
| ALPINE sieve residue > 63$\mu$: | <5%; and |
| particle sizes (cumulative volume distribution): | $d_{95}$ < 40 $\mu$m; $d_{50}$ < 20 $\mu$m; and $d_5$ < 10 $\mu$m; | and wherein the silica particles are formed from silica dried in a pulse combustion dryer.

2. The silica particles as claimed in claim 1, which are precipitated silica particles.

3. The silica particles as claimed in claim 1, which are pyrogenic silica particles.

4. The silica particles as claimed in claim 1, further comprising an organic coating.

5. The silica particles as claimed in claim 1, which are hydrophobic silica particles.

6. The silica particles as claimed in claim 1, which have a wk coefficient of less than 3.4.

7. A coating, comprising the silica particles as claimed in claim 1 and a binder.

8. A silica-filled polymer, comprising the silica particles as claimed in claim 1 and a polymer.

9. The silica-filled polymer as claimed in claim 8, wherein the polymer is an elastomer.

10. A tire, comprising the silica particles as claimed in claim 1 and a rubber.

11. A process for producing silica having a narrow particle size distribution, comprising:

drying a silica suspension in pulse combustion dryer to produce silica particles having the following particle size distribution (cumulative volume distribution) and properties:

| | |
|---|---|
| $d_5$ < 10 $\mu$m; | |
| $d_{50}$ < 20 $\mu$m; | |
| $d_{95}$ < 40 $\mu$m; | |
| BET surface area: | 100–700 m$^2$/g; |
| DBP absorption: | 100–500 g/100 g; |
| tamped density: | 100–250 g/l; and |
| ALPINE sieve residue > 63$\mu$: | <5%. |

12. The process as claimed in claim 11, which is carried out at a drying temperature of 400 to 800° C.

13. The process as claimed in claim 11, wherein the silica suspension has a solids content of from 5 to 25% by weight.

14. The process as claimed in claim 11, further comprising, prior to the drying, coating the silica with an organic coating.

15. The process as claimed in claim 11, further comprising, prior to the drying, making the silica hydrophobic.

16. The process as claimed in claim 11, wherein the silica particles have a wk coefficient of less than 3.4.

17. The process as claimed in claim 11, further comprising, after the drying, classifying the silica particles.

18. The process as claimed in claim 11, wherein the pulse combustion dryer comprises a swirl-inducing element for an air stream used in the drying.

19. The process as claimed in claim 11, further comprising contacting the silica particles with a monomer mixture, and polymerizing the monomer mixture to produce a silica-filled polymer.

20. The process as claimed in claim 11, wherein the polymer is an elastomer.

21. Silica particles, comprising the following physical properties:

| | |
|---|---|
| BET surface area: | 100–700 m$^2$/g; |
| DBP absorption: | 100–500 g/100 g; |
| tamped density: | 100–250 g/l; |
| ALPINE sieve residue > 63$\mu$: | <5%; and |
| particle sizes (cumulative volume distribution): | $d_{95}$ < 40 $\mu$m; |
| | $d_{50}$ < 20 $\mu$m; and |
| | $d_5$ < 10 $\mu$m; | and wherein the particle shape is more uniform and spherical compared to spray-dried products and milled powder.

* * * * *